June 5, 1956  A. E. JENNENS  2,749,088
WEEDER
Filed Oct. 5, 1953
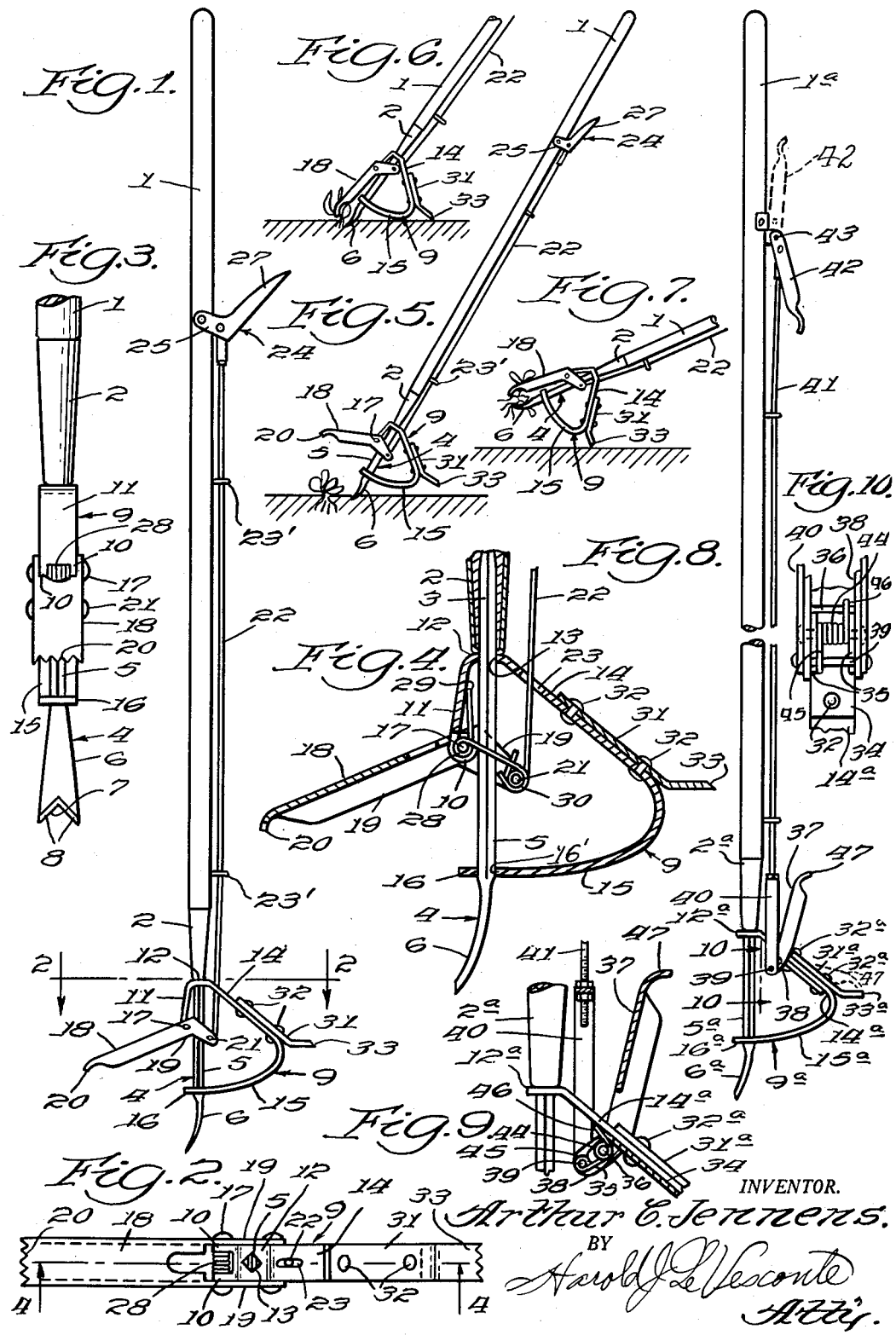
INVENTOR.
Arthur E. Jennens.
BY
Harold J. LeVesconte
Atty.

ated June 5, 1956

United States Patent Office

2,749,088
WEEDER

Arthur E. Jennens, Whittier, Calif.

Application October 5, 1953, Serial No. 384,067

8 Claims. (Cl. 254—132)

This invention relates to gardening tools and more particularly to an organized apparatus for removing weeds including means for first loosening the soil around the root structure of the weed and then finally picking up or pulling the weed for disposition in a container or in a pile to be later picked up.

The principal object of the invention is to provide a weeding tool for gardening requiring a minimum expenditure of effort and having means for first loosening the soil around the root structure of a weed and then pulling the weed and picking it up for depositing the pulled weed in a desired place; all of said operations being capable of accomplishment without stooping.

Another object of the invention is to provide a gardening tool of the above character which is simple in construction, easy to use, and efficient in performance of its intended function.

With the foregoing objects in view, together with such additional objects and advantages as may subsequently appear, the invention resides in the parts, and in the construction, combination, and arrangement of parts disclosed by way of example in the following specification of certain modes of execution of the invention, reference being had to the accompanying drawings which form a part of said specification, and in which drawings:

Fig. 1 is a side elevation of a gardening tool embodying one mode of execution of the invention.

Fig. 2 is an enlarged, top plan sectional view taken on the line 2—2 of Fig. 1,

Fig. 3 is an enlarged, front elevation of the lower portion of the tool shown in Figs. 1 and 2, Fig. 4 is a sectional side elevation of the portion of the device shown in Figs. 2 and 3; the section being taken on the line 4—4 of Fig. 2, Figs. 5, 6 and 7 are views showing the use of the device shown in the preceding figures in the steps of loosening a weed, grasping the loosened weed and picking up the weed for disposal, respectively.

Fig. 8 is a side elevation of a second form of the invention,

Fig. 9 is an enlarged side elevation, partly in section of the ground and weed engaging portions of the form of the invention shown in Fig. 8, and Fig. 10 is an enlarged fragmentary view taken on the line 10—10 of Fig. 8.

Referring first to the form of the invention shown in Figs. 1 through 7, the device comprises a straight handle 1 of such length that it may be readily grasped at spaced points by the user while standing erect. Secured in the lower end of the handle 1 by a ferrule 2 is the tang end 3 of a weed digging tool 4 having a rectangular shank portion 5 extending from the tang 3 in alignment with the handle 1 and terminating in a slightly curved ground engaging end 6 the front end of which is preferably formed with a V-shaped notch 7 having sharpened side edges 8, 8. Mounted on the shank 5 is a frame member 9 preferably formed from a strip of metal and including, as viewed in Figs. 1, 2 and 4, a pair of spaced ear portions 10, 10 at one end thereof, thence extending in an upwardly and slightly rearwardly extending run 11 thence extending in a horizontal run 12 across the end of the ferrule 2; said run having a rectangular hole 13 therein through which the shank 5 extends; thence extending downwardly and rearwardly in a run 14, and thence extending in a curved rocker forming run 15 extending forwardly to an end portion 16 having a second rectangular hole 16' formed therein through which the shank 5 also extends at a point just above the enlargement forming the end 6 thereof. Thus, the engagement of the square tang portion 3 with the handle and the engagement of the square shank 5 with the corresponding holes in the frame member 9 prevent the frame from turning relative to the handle 1 while the engagement of the frame 9 with the end of the ferrule 2 and with the blade portion 6 holds the frame member against endwise movement on the shank 5.

The ear portions 10, 10 carry a pivot pin 17 and straddling the sides of the ear portions 10, 10 and mounted on the pin 17 is the forked end of a jaw member 18, the side portions 19, 19 of said forked end also straddling the shank 5 and extending in rear thereof. From its point of mounting on the pin 17, the clamp member extends forward to a serrated end 20 of such length that when moved on the pin 17 it will move into engagement with the end 6 of the tool 4 as best shown in Figs. 5 and 6. The ends of the side portions 19, 19 of the clamp member in rear of the tool shank 5 are connected by a cross pin 21 and the cross pin 21 is connected by a wire link 22 extending through a hole 23 in the run 14 of the frame member 9 and through guides 23', 23'' carried by the handle 1 to the intermediate portion of an operating grip lever 24 of L-shape in side configuration disposed at the rear of the handle and having a bifurcated end portion 25 straddling the handle 1 near the upper end thereof and pivoted to a bracket 26 mounted on the handle 1. The hand grip portion 27 of the member 24 extends upwardly along the rear face of the handle 1 and a torsion spring 28 mounted on the pin 17 between the ears 10, 10 having an arm 29 engaging the rear face of the run 11 and a second arm 30 engaging the cross pin 21 serves constantly to urge the clamp member to open position with coincident movement of the hand grip portion 27 away from the handle 1.

Additionally, the run 14 of the frame element 9 is provided with a toothed member 31 secured thereto in any suitable manner such as the rivets 32, 32 or by welding or by bolts; said member having a rearwardly and downwardly extending serrated free end portion 33 and being adapted to be employed as a hoe-like digging member for assisting in the loosening of a weed to be pulled or as a foot rest to facilitate penetration of hard ground where that type of action is desirable.

In use, the weed is first loosened by digging underneath the root structure with the digging tool 6 as shown in Fig. 5; such action to be followed by use of the member 31, if necessary. Then the tool is placed with the member 6 adjacent on side of the weed as shown in Fig. 6 and the member 24 is moved in a counterclockwise direction as viewed in Fig. 1 by grasping the handle 1 and the hand grip 27 and closing the hand with resultant movement of the clamp member 18 toward the end 6 of the tool element 4 with resultant gripping of the weed after which by rocking the device on the curved run 15 and on the end of the member 31 as a fulcrum the weed is pulled and can then be deposited at or in the desired place or receptacle. Upon release of the hand grip 27, the spring 28 will move the clamp member 18 back to inoperative position and release the weed or the like gripped thereby.

Referring next to Figs. 8 and 9, a second embodiment of the invention is shown. In these figures, those parts which are substantially like those shown in the first embodiment of the invention are identified by the same numerals with the addition of the exponent a. The chief difference is the arrangement of the clamp member to cooperate with the toothed member 31a rather than with the tool end 6 as shown in the first form of the invention.

To this end, the rivets 32a, 32a also secure a bracket member 34 to the inner face of the run 14a of the frame member 9a; said bracket member having spaced ears 35 in which a pivot pin 36 is mounted. The clamp member 37 is provided with a forked end 38 which straddles the member 14a and the ears of the bracket member 35 and through which the pivot pin 36 also extends. The outer ends of the forked portion 38 of the clamp member carry a cross pin 39 which exteriorly of said forked end pivotally connects the lower ends of a yoke member 40 to the clamp member end 38. The arms of the yoke member 40 extend along the side edges of the frame member run 14a and thence are connected to one end of a wire 41 which at its other end is connected to an intermediate portion of a hand operated lever 42 which at one end thereof is pivotally connected at 43 to the handle 1a near the upper end thereof. A torsion spring 44 is mounted on the pivot pin 36 between the ears 35 of the bracket 34 and includes an arm 45 engaging the cross pin 39 and a second arm 46 engaging the inner face of the frame member run 14a above the bracket 34 constantly tends to urge the clamp member 37 to the inoperative position shown in full lines in Figs. 8 and 9. When a weed is loosened by the tool point 6a with or without further action with the member 31a, the device is positioned with the member 31a in advance of the weed, the lever 42 is moved to the dotted line position shown in Fig. 8 bringing the distal end 47 of the clamp member into engagement with the weed and the end 33a of the member 31a and the gripped weed is then pulled and moved to the desired place and released by allowing the spring 44 to move the clamp member to inoperative position.

Thus both forms of the invention provide means by which weeding operations may be performed in lawns and gardens with a minimum of disturbance to the ground and without the necessity of stooping or kneeling down for that purpose. This makes the device especially desirable for use by older persons for whom weeding is otherwise either difficult or even impossible. Further the design of the device enables it to be used in close proximity to plants with the least possible danger to the plants to be freed of weeds. It is appreciated that in the light of the foregoing disclosure, modifications will suggest themselves to others skilled in the art. Consequently, the invention is not to be deemed to be limited to the exact embodiments disclosed and it will be understood that the invention embraces all such modifications in the parts and in the construction, combination and arrangement of parts as shall come within the purview of the appended claims.

I claim:

1. In a weeding implement, an elongated handle, a ground penetrating element mounted at one end of said handle and disposed in generally axially aligned relation beyond said one end of said handle and including a shank portion and a forwardly curved ground penetrating distal end portion terminating in a sharpened, V-shaped edge; the combined length of said handle and element being such that with said distal end of said element resting on the ground, said handle may be readily grasped at spaced points along its length by the hands of a user while standing substantially erect, a frame member held in fixed relation to said handle by said shank portion of said ground penetrating element and including a curved surface in the rear of said element disposed to contact the surface of the ground when said element is inserted in the ground and to serve as a rolling fulcrum incident to rocking of said implement thereon in loosening a weed in the ground; said curved surface being so shaped as to impart a substantially vertical movement to said distal end portion of said element incident to such rocking movement with resultant minimum disturbance of the ground surface, a clamping jaw hingedly mounted on said implement, means normally holding said jaw in inoperative position, a manually operable lever on said handle disposed in the region thereof grasped by the user, and means connecting said lever to said jaw effective to move said jaw toward said distal end portion of said element rigidly fixed to and disposed beyond the said one end of said handle for clamping a previously loosened weed or the like therebetween for lifting the same from the ground.

2. A weeding implement as claimed in claim 1 in which said shank is non-circular in cross section and in which said frame member comprises a strip of metal bent on itself to form said rolling fulcrum surface and having aligned, non-circular holes adjacent its ends through which said shank extends in close fitting engagement effective to prevent rotation of said frame member on said shank and in which one end of said frame member engages said handle and the other end thereof engages said flattened portion of said ground penetrating element to prevent endwise movement of said frame member on said shank.

3. A weeding implement as claimed in claim 1 in which said jaw is movable toward said ground penetrating element to effect weed clamping action therebetween and in which the means for moving said jaw into weed clamping engagement includes a link extending parallel to said handle from said manually operable lever to said jaw.

4. A weeding implement as claimed in claim 1 in which said jaw is pivotally mounted on said frame member in front of said shank.

5. A weeding implement as claimed in claim 4 in which the means for holding said jaw in inoperative position comprises a torsion spring mounted on said pivotal mounting for said jaw and having one end thereof engaging said frame member and the other end thereof engaging said jaw.

6. A weeding implement as claimed in claim 1 in which said frame member carries a digging claw element at the end of said rolling fulcrum surface remote from said ground penetrating element and in which said jaw is mounted on said frame member in the rear of said shank for movement about a pivot carried by said frame member toward and away from said digging claw element incident to clamping and releasing a weed therebetween.

7. A weeding implement as claimed in claim 6 in which the means for moving said jaw to inoperative position comprises a torsion spring mounted on said pivot and constantly tending to urge said jaw to inoperative position.

8. A weeding implement as claimed in claim 7 in which said digging claw element is so disposed as to serve as a foot rest for use in forcing said ground penetrating element into the ground.

References Cited in the file of this patent

UNITED STATES PATENTS

| | | |
|---|---|---|
| 870,955 | Hazzard | Nov. 12, 1907 |
| 917,802 | Schneider | Apr. 13, 1909 |
| 919,748 | Nason | Apr. 27, 1909 |
| 1,036,283 | Lindsey | Aug. 20, 1912 |
| 1,142,783 | Eagan | June 8, 1915 |
| 1,640,732 | Simpson | Aug. 30, 1927 |
| 1,822,675 | Shelkofsky | Sept. 8, 1931 |
| 2,394,568 | Stewart | Feb. 12, 1946 |
| 2,470,899 | Rink | May 24, 1949 |